May 17, 1960 H. MERCIER 2,937,238

MULTIPLEX TELECOMMUNICATION SYSTEM

Filed May 19, 1954 2 Sheets-Sheet 2

United States Patent Office 2,937,238

Patented May 17, 1960

2,937,238

MULTIPLEX TELECOMMUNICATION SYSTEM

Henry Mercier, Charleroi, Belgium, assignor to Ateliers de Constructions Electriques de Charleroi, Brussels, Belgium, a corporation of Belgium Application May 19, 1954, Serial No. 430,915

Claims priority, application France May 20, 1953

5 Claims. (Cl. 179—15)

The present invention relates generally to multiplex telecommunication systems with division in time, and more particularly, to multiplex telecommunication systems using impulse modulation either in duration or in position, especially in conjunction with delay lines.

It is well known that delay lines must be fed by impulses for easy control of channel modulation. In addition it is also known that it is quite advantageous to feed or apply sinusoidal waves to the delay lines. In multiplex telecommunication systems using impulse modulation, use is made of delay lines to separate the impulses of the different transmission channels during the period of recurrence with reference to an initial signal. Accordingly, a synchronization signal or an impulse controlled thereby is fed to the delay lines.

A delay line generally comprises a low-pass filter the cut-off frequency of which increases as the impulse duration, which is to be delayed, is decreased. The cut-off frequency of a low-pass filter is usually given as a function of its components, the inductance of the inductive elements or coils and the capacitance of the condensers, and is given by the following expression:

$$f_0=\frac{1}{\pi\sqrt{LC}} \quad (1)$$

Wherein, $f_0$ is the cut-off frequency,

L is the inductance of the coil of the delay line in henrys, and

C is the capacitance of the condenser of the delay line in farads.

In a similar manner, the time of delay $D_t$ of each delay line comprising the delay unit is:

$$D_t=\frac{1}{\pi f_0} \quad (2)$$

and $$D_t=\sqrt{LC} \quad (3)$$

It therefore follows that the delay per delay line of the delay unit becomes lower as the frequency increases, or as the duration of the impulse decreases. Consequently, in order to produce a given amount of delay, it is necessary to increase the number of delay lines comprising the delay unit as the duration of the impulse, which is to be delayed, decreases. Hence, the delay units usually used are quite cumbersome, complicated, clumsy and expensive.

In addition, it has been found through experience that the delay lines comprising the delay units are not very stable over long periods of time and have a tendency to change, thereby producing changed characteristics. Further, systems employing complicated delay units tend to distort the sides of the impulses applied thereto, necessitating the use of limiters or overdriven amplifiers in the middle of the delay lines of the delay units.

The present invention overcomes all of the aforesaid objectional features, since it employs delay lines which are extremely simple and have a very low cut-off frequency.

In accordance with the present invention, a multiplex telecommunication system with division in time using impulse modulation for providing impulses modulated in position or in duration is adapted both for the reception and the transmission of said impulses and generally includes a delay unit comprising a plurality of delay lines adapted for the reception of a sinusoidal signal having an oscillation period which is very much greater than the time duration of a predetermined impulse, and adapted for the production of sinusoidal oscillations at the output of each delay line, the sinusoidal oscillation output of one delay line being dephased a predetermined amount with respect to the output of another delay line of the delay unit. At the transmission station, the telecommunication system generally comprises a sinusoidal oscillation generator and a synchronization signal generator, wherein the oscillations are applied simultaneously to said synchronization signal generator and to said delay unit. At the receiving station, the telecommunication system includes a selector of synchronization signals and a sinusoidal oscillation regenerator the principal element of which is a tuned band filter connected to said delay unit.

More particularly, at the transmission station the system includes a sinusoidal oscillation generator, a synchronization impulse generator, a delay unit, modulating units, and a mixer. Sinusoidal oscillations are sent from the sinusoidal oscillation generator to the delay unit and to the synchronization impulse generator. The delay unit which comprises a plurality of delay lines is associated with a like plurality of modulators. Associated with each of the modulators is a low frequency transmitting source which transmits a low frequency oscillation to the modulators, wherein the delayed sinusoidal oscillations are combined with the low frequency oscillations wherein impulses are produced which are modulated in position, after which they are transmitted to the mixer. Also transmitted to the mixer are the impulses produced by the synchronization signal generator, after which the complex signal produced by the mixer is transmitted to a receiving unit.

The receiving unit generally includes a selector of synchronization signals, a regenerator of sinusoidal oscillations, which includes a tuned band filter, a delay unit, and a demodulator for each delay line of the delay unit, a filter for each demodulator and means for transmitting the low frequency oscillations. The complex signal transmitted by the transmitting unit is applied simultaneously to the selector of synchronization signals and to the demodulators. In addition, the regenerator of sinusoidal oscillations is excited by the synchronization signals and sends a sinusoidal oscillation to the delay unit wherein portions thereof are delayed with respect to other portions and then sent to the corresponding demodulators, after which the proper signals are applied to each of the means for transmitting the low frequency oscillations.

It is therefore an object of the present invention to provide a selector of synchronization signals feeding a sinusoidal oscillation regenerator adapted to generate an oscillation synchronized with the sinusoidal oscillation of the transmitting unit in order to apply said oscillation to the delay unit.

Another object of the present invention is to provide a novel selector of synchcronization signals for use in a time division multiplex telecommunication system.

Another object of the present invention is the provision of an improved mulitplex telecommunication system with division in time of the above character, which is of simple design and construction, economical to manufacture, and highly efficient in the accomplishment of its intended purpose.

For a better understanding of the invention, together with other and further objects thereof, reference is had to the following description taken together with the accompanying drawings which illustrate the presently preferred mode for practicing the invention.

Figure 1:
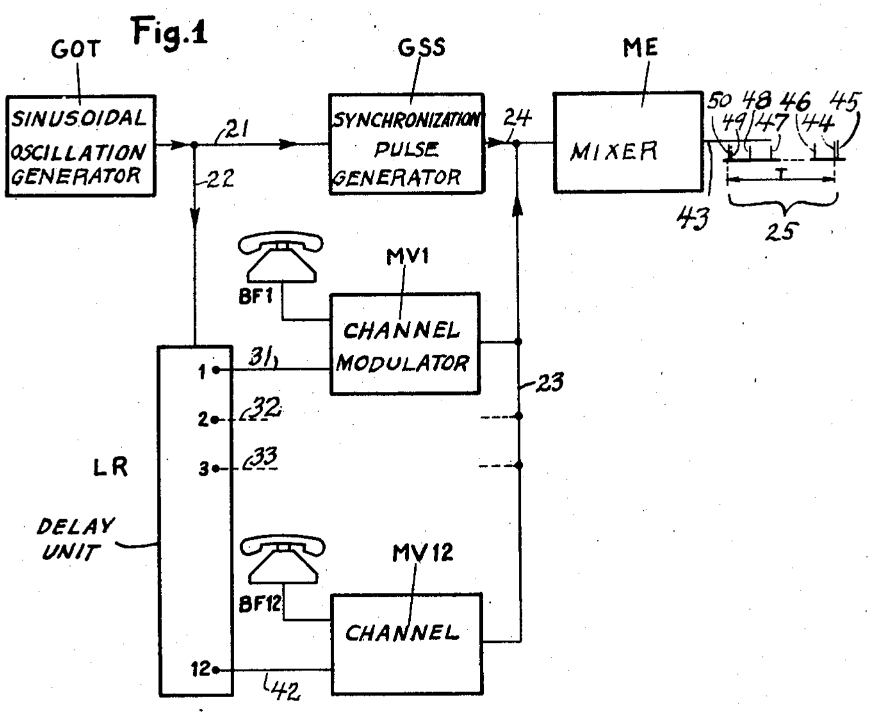
Fig. 1 is a block diagram of a twelve channel transmitter.

Referring now more particularly to Fig. 1, which illustrates a twelve channel transmitter, comprising a sinusoidal oscillation generator GOT, a synchronization signal generator GSS, a delay unit LR, modulating units MV1—MV12, low frequency sources BF1—BF12, and a mixer ME.

The sinusoidal oscillation generator GOT emits a signal the frequency of which is $f$ or $1/T$ of, for example and not by way of limitation, 8000 kilocycles per second and is applied through lines 21 and 22 to the synchronization signal generator GSS and to the delay unit LR, respectively. The delay unit LR comprises, for purposes of illustration and not by way of limitation, twelve delay lines as represented by the contacts numbered 1–12, inclusive, to produce twelve sinusoidal oscillations each of which is delayed a predetermined amount. For example, the sinusoidal oscillation derived from contact 1 of the delay unit LR has a predetermined reference phase; the sinusoidal oscillation derived from contact 2 of delay unit LR also has a predetermined reference phase, however, the oscillation from contact 2 is out of phase with contact 1 by a predetermined amount, such as X electrical degrees. The manner for deriving X will be hereinafter further explained. In a similar manner, the sinusoidal oscillations 3 to 12 of the delay unit LR are similarly out of phase with each other and with contacts 1 and 2 by said predetermined amount.

In a similar manner, contacts 4, 5, 6, 7, 8, 9, 10, 11 and 12 are out of phase with contact 1 by 4X, 5X, 6X, 7X, 8X, 9X, 10X, 11X and 12X electrical degrees, respectively.

The amount sinusoidal oscillations emitted from contact 2 are out of phase with contact 1, and denoted hereinbefore as X, is given by the following expression:

$$X=\frac{T-T'}{N+1} \quad (4)$$

wherein, T is the period of the sinusoidal oscillations emitted from the sinusoidal oscillation generator GOT, T' is the duration of the synchronization signal emitted by the synchronization pulse generator GSS, N is the number of channels of communication.

When twelve channel modulators are used to correspond with the twelve contacts of the delay unit LR, which was illustrated with twelve contacts, merely by way of example, the formula of 4 becomes:

$$X=\frac{T-T'}{12+1}=\frac{T-V'}{13} \quad (5)$$

and, when the duration T' is made $3\times10^{-6}$ seconds, and $T=125\times10^{-6}$ seconds corresponding to $$\frac{1}{T}=8{,}000 \text{ c.p.s.}$$

the formula of 5 becomes:

$$X=\left(\frac{125-3.10^{-6}}{13}\right)=\frac{122\times10^{-6}}{13} \text{ seconds} \quad (6)$$

which means that the sinusoidal oscillations emitted from contact 2 of the delay line LR are out of phase with the sinusoidal oscillations emitted from contact 1 by $122/13\times10^{-6}$ seconds or 122/13 microseconds. Two pulses of one microsecond duration the crests of which are T' emitted from the synchronization pulse generator GSS, is obtained when said synchronization pulse generator transmits pulses separated from each other by 2 microseconds every T seconds, thereby giving the pulse duration T' of 3 microseconds.

Associated with each contact of the delay unit LR is a channel modulator, the circuit components of which will be hereinafter further explained. Accordingly, channel modulators 1 to 12, inclusive are denoted on the drawing by MV1 to MV12, respectively. For the purpose of clarity, only channel modulator 1, MV1 and channel modulator 12 are illustrated. Each of the channel modulators has the dephased sinusoidal oscillations applied through lines 31, 32, 33, 34, 35, 36, 37, 38, 39, 40, 41, and 42 from contacts 1, 2, 3, 4, 5, 6, 7, 8, 9, 10, 11 and 12 of delay unit LR, respectively to channel modulators 1, 2, 3, 4, 5, 6, 7, 8, 9, 10, 11 and 12, respectively. It is noted that only lines 31 and 42 are shown, with lines 32 and 33 being simulated by a broken line and lines 34, 35, 36, 37, 38, 39, 40, and 41 being omitted similar to the omission of contacts 4, 5, 6, 7, 8, 9, 10 and 11 merely for the purposes of clarity and to facilitate the representation by the figures.

Associated with each of the channel modulators is a telephone set or other source of audible frequencies BF1 to BF12, inclusive, each respectively being associated with a corresponding one of the channel modulators MV1 to MV12, inclusive. The various channel modulators combine the audio signals from the telephone sets with the high frequency sinusoidal oscillation from the contacts of the delay unit and produces impulses modulated in position, as will be hereinafter further explained. The various modulated signals are fed by means of line 23 to a mixer ME and combined therein. Also fed to mixer ME are the pulses produced by the synchronization pulse generator GSS, which are fed through line 24 which couples the synchronization pulse generator GSS to the mixer ME. The complex modulator signal is derived from the mixer ME. The signal generally indicated at 25 constitutes the complex modulator signal which can be transmitted to a receiving station where the complex modulator signal 25 is broken up into its basic components whereby to activate twelve separate receivers for transmitting a signal thereto from the source of audio frequencies BF1 to BF12, respectively.

The channel modulators MV1—MV12, referred to hereinbefore are of the type disclosed and claimed in the copending United States application, Serial No. 430,916, filed May 19, 1954, and assigned to the assignee of this invention.

The impulses modulated in position by the channel modulators MV1—MV12 and the synchronization impulses are combined in the mixer ME and then sent to an antenna (not shown) through line 43. The combined pulses transmitted through line 43 to the antenna (not shown) is indicated at 25. The letter T indicates the period of frequency $1/T$ and shows the complex signal in each period T and consists of two tynchronizing impulses 44 and 45 followed by the impulses modulated in positions 46, 47 and 48. Synchronizing impulses 49 and 50 indicate the commencement of the next period T.

Figure 2:
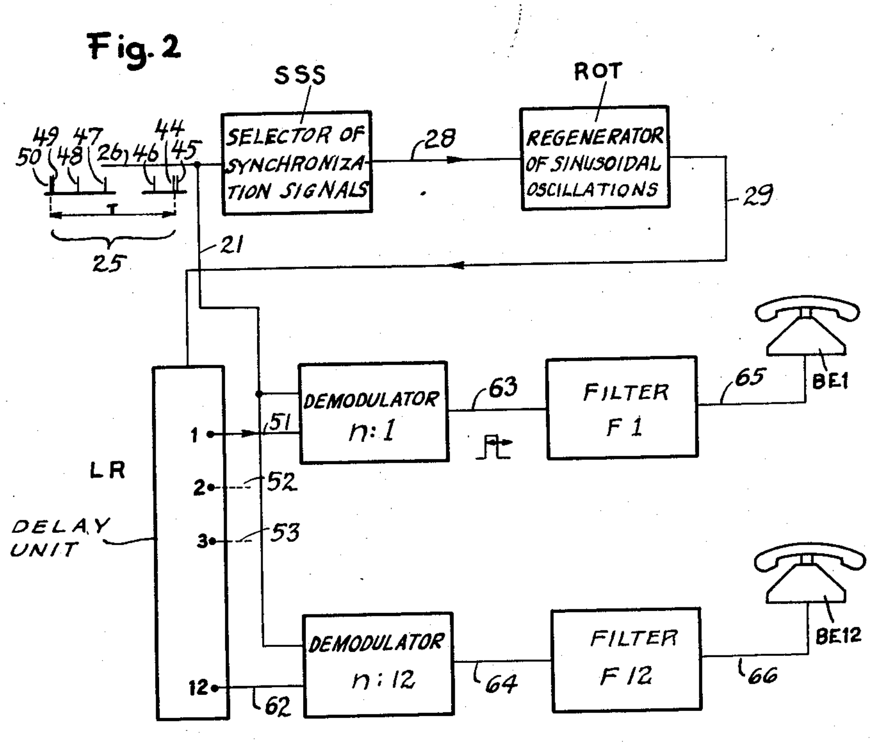
Fig. 2 is a block diagram of a twelve channel receiver.

Referring now more particularly to Fig. 2, which illustrates a twelve channel receiver especially well adapted for the reception of the impulses transmitted from the transmitter of Fig. 1, and comprises a selector of synchronization signals SSS, a regenerator of sinusoidal oscillations ROT, a delay unit LR, similar in all respects to the delay unit LR of Fig. 1, demodulating units $n$:1–$n$:12, filters F1—F12 and receivers of audio oscillations BE1–BE12.

The composite signal 25 comprising the two synchronizing impulses 44 and 45 and the impulses modulated in positions 46, 47 and 48 comprising the period T and the synchronizing impulses signalling or indicating the start of the next period T, 49 and 50 are received by an antenna (not shown) and applied through line 26 to the selector of synchronizing signals and to the demodulating units $n$:1–$n$:12 through line 27. The regenerator of sinusoidal oscillations ROT is fed by the synchronization signal selector SSS by means of line 28, after which said regenerator of sinusoidal oscillations feeds the delay unit LR through line 29 with sinusoidal oscillations having the same frequency $f$ as the sinusoidal oscillations generated by the generator of sinusoidal oscillations GOT of Fig. 1. The manner in which the selector of synchronization signals SSS and the regenerator of sinusoidal oscillations ROT converts the composite signal 25 to the sinusoidal oscillations of frequency $f$ which are applied to the delay unit LR will be hereinafter further explained. The signals 46, 47 and 48 are sent to the demodulating units $n$:1–$n$:12 where they interact with the sinusoidal oscillations delivered by the proper contacts of the delay unit LR.

The receiving station comprises twelve demodulators $n$:1, $n$:2, etc. to $n$:12, inclusive, one for each channel, since we have a twelve channel transmitter, it is necessary to have a twelve channel receiver. However, it is to be understood that more or less than twelve channels may be employed according to the desired number of signals it is desired to multiplex. In a manner similar to the transmitter of Fig. 1, the delay unit LR comprises twelve delay lines, one delay line for each demodulator. The demodulators $n$:1, $n$:2, etc.–$n$:12 are coupled to contacts 1–12 of the delay unit LR, respectively, through lines 51, 52, 53, etc.–62. Only two demodulators have been illustrated in order not to obscure the drawing, and lines 52 and 53 are shown broken in order to indicate that they are associated with demodulators $n$:2 and $n$:3, respectively, but not shown. In addition, the output of each of the demodulators is applied to a filter F for obtaining the audio oscillation which is then applied to a telephone set or a receiver of audio oscillations. More particularly, filter F1 is associated with demodulator $n$:1 and filter F12 is associated with demodulator $n$:12 and are coupled, respectively, thereto by means of lines 63 and 64. It is to be understood that the demodulators $n$:2–$n$:11 have associated therewith filters F2–F11, respectively, not shown for the purposes of clarity. In addition, the telephone sets BE1 and BE12 are coupled to filters F1 and F12 through the intermediation of lines 65 and 66, respectively. It is to be understood that the telephone sets BE2—BE11, not shown, are associated with filters F2—F11, not shown, respectively.

The composite signal which is picked up by line 26 is sent to the demodulating units $n$:1–$n$:12 where the proper demodulator picks up the proper signal. The delayed sinusoidal signals applied to the demodulators makes them receptive in turn one after the other so that each demodulator may pick up the impulse of the composite signal intended for it.

Figure 3:
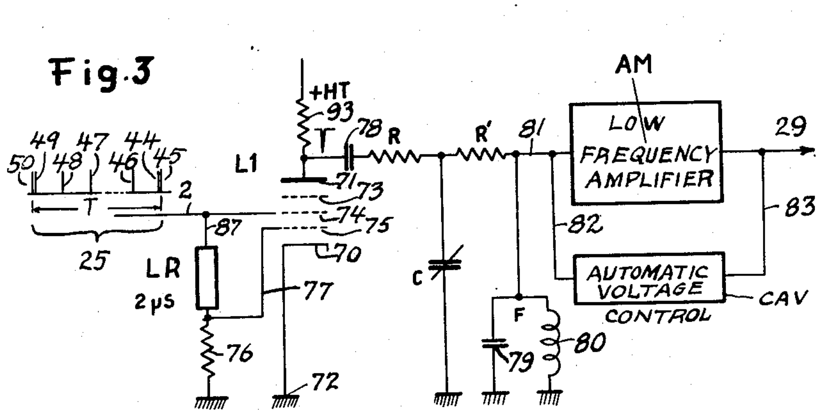
Fig. 3 is a schematic diagram of portions of the receiver according to the present invention.

Pursuant to another feature of the present invention, as more clearly illustrated in Fig. 3, the regenerator of sinusoidal oscillations ROT, the selector of synchronization signals SSS comprises a little delay line LR 2 μs., quite different from the delay unit LR which delays the pulses of the composite signal for a duration of 2 microseconds. It comprises a screen grid circuit and a grid control circuit of a pentode having a floating suppressor grid with an output circuit comprising a filter circuit tuned to the frequency $f$ or $1/T$. The filter circuit is coupled to the pentode tube through an integrating circuit. More particularly, the circuit of Fig. 3 comprises the pentode tube L1, having a cathode 70 and anode 71 whose anode-cathode current path is connected across a source of potential supply having a point of reference potential 72 coupled directly to cathode 70 and a point of potential HT which is positive with respect to said source of reference potential or ground potential 72, coupled through a load resistor 93 to anode 71. Said tube L1 further includes a floating suppressor grid 73, a screen grid coupled to lines 26 and 87 and a control grid 75 coupled to line 77 and through the last contact 12 of resistor 76 to ground 72.

The circuit of Fig. 3 further includes the regenerator of sinusoidal oscillations ROT which includes an integrating circuit comprising a resistor R coupled on one end to a coupling or blocking condenser 78 to the common connection of resistor 93 and anode 71 and coupled at its other end to condenser C which forms part of the integrating circuit; a band pass filter F, which is tuned to the frequency $f$ or $1/T$ and comprises the parallel combination of condenser 79 and inductor 80, each coupled at one end thereof to said source of reference potential or ground potential 72 and each coupled at another end thereof through an isolating resistor R′ for deriving the integrated output across condenser C and a low frequency amplifier AM having an automatic voltage control CAV connected in parallel therewith for maintaining the output voltage applied through line 29 to the delay unit LR, the output of filter F being applied through line 81 to the low frequency amplifier AM, and the automatic voltage control CAV is coupled to the filter F and the low frequency amplifier AM by means of line 82, and to the output of the low frequency amplifier AM by means of line 83.

The circuit of Fig. 3 shows line 87 going directly from the screen grid 74 to the delay line LR 2 μs. and shows the line 77 going from the end of the delay line LR 2 μs. to the control grid 75.

The operation of the circuit of Fig. 3 is as follows:

The complex signal of positive polarity indicated by the numeral 25 is applied through an antenna (not shown) to line 26 of the receiving unit. The complex signal 25 is applied from line 26 to the screen grid 74 of tube L1 and of the delay line LR 2 μs. by means of line 87. The delay line LR 2 μs. is adjusted to provide a delay whereby to delay pulses of the complex signal by two (2) microseconds. The output of the delay unit LR 2 μs. is coupled to the control grid 75 through line 77. The control grid 75 is biased by resistor 76 so as to maintain tube L1 normally non-conductive but capable of being rendered conductive by an impulse which is positive and of the order of magnitude of the pulses transmitted by the synchronization pulse generator GSS. Consequently, when impulse 45 passes through the delay unit LR 2 μs. and is applied to grid 75 and the impulse 44 is applied to the screen grid 74 by means of line 26, tube L1 is rendered conductive. Since impulses 44 and 45 are separated in time by two (2) microseconds and delay unit LR 2 μs. is effective for imparting a two (2) microsecond delay to an impulse applied to it, tube L1 is effective as a coincidence indicator whereby the delay unit LR 2μs. causes impulses 44 and 45 to be applied at the same time to screen grid 74 and control grid 75, respectively, whereby to render tube L1 conductive.

When tube L1 is rendered conductive, the voltage at anode 71 drops as result of the drop in voltage across resistor 93, thereby producing a negative pulse which is applied through condenser 78 to the integrating circuit each time tube L1 is rendered conductive. The regenerator of sinusoidal oscillations ROT is responsive to the negative pulse applied to it for converting said pulse to a sinusoidal oscillation. The aforesaid negative impulses can be converted into their Fourier components, the frequencies of which differ by the frequency of the fundamental component. The fundamental component is the one of particular importance and is derived by integrating the negative pulse output of tube L1 and filtering the integrated output. An integrating circuit is a circuit arrangement which produces an output voltage substantially in proportion to the frequency and amplitude of the input voltage. When a substantially square wave pulse is applied to an integrating circuit the high frequency components are eliminated and some of the low frequency components are retained. In addition, since condenser C can be adjusted, it is possible to obtain various integrated outputs so as to vary the phase of the sinusoidal output of the regenerator of sinusoidal oscillations ROT with respect to the synchronization impulses 44 and 45. The resistance R which is considerably higher than the load resistor 93 serves to keep the effective plate impedance substantially constant, so as to maintain the operating point of tube L1 substantially constant.

The filter F, which comprises the parallel combination of condenser 79 and inductor 80 is a band pass filter which is tuned to the frequency $f$ or $1/T$ in order to provide a sinusoidal oscillation output of the same frequency as the sinusoidal oscillation generator GOT. In order to properly synchronize the demodulators $n$:1–$n$:12 (Fig. 2) said sinusoidal oscillation applied to the delay unit LR thus the output of each delay line of the delay unit LR will synchronize its associated demodulator by rendering it receptive to the proper impulsions of said composite signals 25 applied thereto.

The advantage of the telecommunication system of the present invention resides in the fact that it allows for considerable simplification of the delay unit as a result of reducing the cut-off frequency of the delay unit to the frequency of the fundamental component or the frequency of pulse repetition, and therefore to a frequency below 10 kilocycles.

While there have been described what are at present considered the preferred embodiments of the invention, it should be obvious to those skilled in the art that various changes and modifications may be made therein without department from the invention.

What I claim and desire to secure by Letters Patent is:

1. In a multiplex telecommunication system for receiving complex signals consisting of a carrier wave and a pair of recurrent synchronization pulses and modulated intelligence impulses, in combination, means to receive said complex signals including said pair of synchronization pulses and responsive thereto for generating an output indicative of when said pair of pulses are in a given time-relationship, oscillation regenerating means connected to receive said output and responsive to said output for converting said output into a sinusoidal oscillation output having a period equal to the period of recurrence of said synchronization pulses, a delay unit connected to receive the regenerating means output comprising a plurality of output lines for the transmission of a plurality of sinusoidal oscillations each dephased with respect to each other, demodulating means gated by said dephased oscillations individually connected to said output lines, and means to apply said modulated impulses to said demodulating means.

2. The system according to claim 1, in which said means responsive to the synchronization pulses comprises selector means for indicating when said pair of pulses are in said given time-relationship, means for generating an output impulse in dependence upon said pair of pulses being in said given time-relationship, said oscillation regenerating means including an integrating circuit connected to receive the output impulse of said synchronization-pulse-responsive means and responsive thereto for eliminating high frequency components of the output of said last mentioned means, and means tuned to the lowest harmonic of the output impulse of said synchronization-pulse-responsive means to produce said sinusoidal oscillation at the same frequency as the carrier wave of said intelligence impulses.

3. The system according to claim 1, in which said means responsive to the synchronization pulses includes selector means for indicating when said pair of pulses are in a given time-relationship and means for generating an output impulse in dependence upon said pair of pulses being in said given time-relationship, said selector means comprising a tube having at least a cathode, a control grid, a screen grid and an anode, a delay line coupled between said control grid and said screen grid, said delay line having a predetermined amount of delay thereby to delay a pulse through it a predetermined time, means to maintain said tube normally non-conductive and for allowing said tube to be rendered conductive when said pair of pulses are applied to said grids simultaneously, means for applying said pulses to said screen grid and said delay line, means for applying a delayed pulse output from said delay line to said control grid, thereby to apply said pair of pulses simultaneously to said grids and render the tube conductive when said pulses are spaced in time by the amount said delay line delays a pulse, and said oscillation regenerating means including an integrating circuit responsive to the output impulse of said synchronization-pulse-responsive means for eliminating the high frequency components of said output impulse, and means tuned to the lowest harmonic of the output impulse of said synchronization-pulse-responsive means to generate said sinusoidal oscillation at the same frequency as the carrier wave of said intelligence impulses.

4. The system according to claim 1, in which said means responsive to the synchronization pulses includes selector means for selecting only said pairs of pulses in a given time-relationship, means for generating an output impulse in dependence of said pairs of pulses being in said given time-relationship, said oscillation regenerating means including an integrating circuit responsive to said output impulse and means for eliminating the high frequency components of said output impulse, said integrating circuit including a variable condenser to vary the phase of the sinusoidal output of said regenerating means, and means tuned to the lowest harmonic of the output impulse of said synchronization-pulse-responsive means to generate said sinusoidal oscillation at the same frequency as the carrier wave of said intelligence impulses.

5. The system according to claim 1, in which said means responsive to the synchronization pulses includes selector means for selecting only said pairs of pulses in a given time-relationship and means for generating an output impulse in dependence upon said pairs of pulses being in a given time-relationship, said oscillation regenerating means including an integrating circuit responsive to the output impulse of said synchronization-pulse-responsive means for eliminating the high frequency components of the output of said pulse-responsive means, said integrating circuit including a variable condenser to vary the phase of the sinusoidal output of said oscillation regenerating means, and means tuned to the lowest harmonic of the output impulse of said synchronization-pulse-responsive means to produce said sinusoidal oscillation at the same frequency as the carrier wave of said intelligence impulses, said tuned means comprising a tuned band filter having a parallel combination consisting of a condenser and inductor coupled to the output of said integrating circuit.

References Cited in the file of this patent

UNITED STATES PATENTS

| | | |
|---|---|---|
| 1,645,607 | Matte | Oct. 18, 1927 |
| 2,414,265 | Lawson | Jan. 14, 1947 |
| 2,454,815 | Levy | Nov. 30, 1948 |
| 2,459,131 | Mesner | Jan. 11, 1949 |
| 2,541,076 | Labin et al. | Feb. 13, 1951 |
| 2,680,153 | Boothroyd | June 1, 1954 |
| 2,779,933 | Bradburd | Jan. 29, 1957 |